United States Patent
Blum et al.

(10) Patent No.: US 6,294,591 B1
(45) Date of Patent: Sep. 25, 2001

(54) METHOD FOR PRODUCING POLYMERS CROSS-LINKABLE BY RADIATION, ACRYLIC OR METHACRYLIC ACID ESTERS

(75) Inventors: Rainer Blum, Ludwigshafen; Peter Keller, Spiesen-Elversberg, both of (DE)

(73) Assignee: BASF Coatings AG, Muenster (DE)

( * ) Notice: Subject to any disclaimer, the term of this patent is extended or adjusted under 35 U.S.C. 154(b) by 0 days.

(21) Appl. No.: 09/331,062

(22) PCT Filed: Dec. 16, 1997

(86) PCT No.: PCT/EP97/07074

§ 371 Date: Jun. 16, 1999

§ 102(e) Date: Jun. 16, 1999

(87) PCT Pub. No.: WO98/28345

PCT Pub. Date: Jul. 2, 1998

(30) Foreign Application Priority Data

Dec. 20, 1996 (DE) ............................. 196 53 631

(51) Int. Cl.⁷ ............................. C08F 2/48; C08F 220/18; C08F 263/02

(52) U.S. Cl. ............................. 522/35; 522/153; 522/129; 522/130; 522/904; 522/905; 526/283; 526/328; 526/328.5

(58) Field of Search ............................. 522/35, 904, 905, 522/153, 182, 181, 149, 129, 130, 120, 122; 526/283, 328, 328.5, 329.5, 329.6

(56) References Cited

U.S. PATENT DOCUMENTS

| 3,715,342 | * | 2/1973 | Colomb, Jr. et al. . | |
|---|---|---|---|---|
| 3,974,303 | | 8/1976 | Iwase et al. | 427/27 |
| 4,064,161 | | 12/1977 | Lewis et al. | 526/320 |
| 4,071,489 | * | 1/1978 | Emmons et al. . | |
| 4,148,987 | * | 4/1979 | Winey . | |
| 4,319,009 | * | 3/1982 | Friedli et al. . | |
| 4,737,559 | * | 4/1988 | Kellen et al. . | |
| 5,073,611 | | 12/1991 | Rehmer et al. | 526/208 |
| 5,128,386 | * | 7/1992 | Rehmer et al. . | |
| 5,276,069 | | 1/1994 | Rehmer et al. | 522/35 |
| 5,532,112 | * | 7/1996 | Kohler et al. . | |
| 5,741,829 | * | 4/1998 | Reich et al. . | |
| 5,773,485 | * | 6/1998 | Bennett et al. . | |
| 5,859,084 | * | 1/1999 | Schroder et al. . | |

FOREIGN PATENT DOCUMENTS

| 2436186 | 3/1995 | (DE) . |
|---|---|---|
| 395990 | 11/1990 | (EP) . |
| 458164 | 11/1991 | (EP) . |

* cited by examiner

Primary Examiner—Susan W. Berman
(74) Attorney, Agent, or Firm—Keil Weinkauf

(57) ABSTRACT

A process is described for preparing radiation-crosslinkable polymeric acrylates and methacrylates, which involves reacting an acrylate or methacrylate copolymer containing units having a reactive side group with a compound that contains a group which is capable of reacting with the reactive side group and also a group which is capable of forming free radicals under the action of actinic radiation. The preparation of the modified, photoactive polymers by polymer-analogous reaction makes it possible to do without the laborious handling of aggressive, specially synthesized monomers, especially acrylic esters. The products of the process can be employed widely as radiation-curable coating materials.

4 Claims, No Drawings

METHOD FOR PRODUCING POLYMERS CROSS-LINKABLE BY RADIATION, ACRYLIC OR METHACRYLIC ACID ESTERS

The invention relates to a process for preparing radiation-crosslinkable polymers based on polymeric acrylates or methacrylates, generally referred to below for short as (meth)acrylates. Polymers of this kind are known and are used to produce radiation-curable coatings, paints, adhesives or impregnating compositions.

These polymers are copolymers comprising units of (meth)acrylates, especially the alkyl esters, and possibly (meth)acrylic acid, and units having polymerizable or crosslinkable groups. Polymerization or crosslinking takes place either thermally, ie. at elevated temperature, or—preferably—by exposure to actinic radiation, especially ultraviolet radiation. Crosslinking by radiation requires the presence of initiators which can be activated by radiation, especially free-radical initiators. Such compounds are often not very compatible with the polymers, and tend to separate out. Coating of the substrate that is to be treated is therefore generally carried out from a solution in a common solvent for both of the components.

Because of the environmentally polluting solvent vapors produced in this operation, attempts have been made more recently to employ solvent-free coating compositions, which are either liquid and comprise low molecular polymerizable constituents or which can be applied from the melt or as a powder coating. Compositions comprising liquid monomers have an unpleasant odor, are often allergenic and are of only limited storage life. To prepare compositions consisting essentially of solid constituents it is necessary, for the reasons given above, to incorporate photoinitiator units into the reactive polymers.

EP-A 458 164 describes radiation-crosslinkable polymers containing copolymerized units having phenone radicals, especially benzophenone radicals, in side groups.

EP-A 395 990 describes UV-crosslinkable copolymers which contain units of compounds capable of hydrogen abstraction and photoreactive units.

The preparation of these known polymers and the introduction of the reactive radicals takes place in each case by polymerizing a mixture of the starting materials. To prepare the individual end products, therefore, it is necessary in each case to prepare the monomers substituted by the functional groups, especially the photo-reactive groups, these monomers generally being (meth)acrylates, and to isolate these monomers in the purity required for polymerization. This technique requires the handling of aggressive monomers up to the final stage and is laborious on account of additional purification steps.

It is an object of the present invention to propose a process for preparing radiation-crosslinkable, polymeric (meth)acrylates having different reactive substituents, especially photoactive substituents, with or without further, crosslinkable, substituents, in which it is possible, for individual products, to start from a common, nonaggressive product which is, if appropriate, available on the industrial scale as well and to obtain, by reaction with readily available co-reactants, a large number of different desired end products.

We have found that this object is achieved by a process for preparing radiation-crosslinkable, polymeric (meth)acrylates that consists in reacting an acrylate or methacrylate copolymer containing units having a reactive side group with a compound that contains a group which is capable of reacting with the reactive side group and also a group which is capable of forming free radicals under the action of actinic radiation.

The term "radiation-crosslinkable" is intended for the purposes of this description to refer to a layer or mixture that can be permanently altered in its properties, in particular in its solubility, by actinic, ie. chemically active radiation. Short-wave visible or long-wave ultraviolet light is preferably employed as such radiation. Any relatively high-energy radiation is of course also suitable, such as short-wave UV light, electron beams, X-rays or gamma radiation, or—given appropriate sensitization—relatively long-wave light as well. Laser radiation can likewise be employed.

As (meth)acrylate copolymers it is preferred to employ those which in addition to (meth)acrylate units also comprise units having hydrogens which can be eliminated by the action of free radicals. Particularly suitable such units are those having tertiary hydrogens or hydrogens a to a double bond. Units of other copolymerizable monomers, for example maleic or fmaric acid compounds, can also be present in the copolymers.

Reactive side groups in the (meth)acrylate copolymers employed are especially isocyanate, hydroxyl, carboxyl, carboxylic anhydride, amino or oxirane groups. These groups have generally been introduced by copolymerization with appropriate monomers, for example with hydroxyalkyl (meth)acrylates, (meth)acrylic acid, aminoalkyl (meth)acrylates, isocyanatoalkyl (meth)acrylates or glycidyl (meth)acrylate.

The groups, in the generally low molecular mass co-reactants of the copolymers, that have the capacity to react with the reactive side groups of said copolymers are preferably hydroxyl, carboxyl, carboxylic anhydride, isocyanate or amino groups. Examples of such low molecular mass co-reactants are hydroxy-, hydroxyalkyl- or hydroxyalkoxybenzophenones, -anthraquinones or -thioxanthones. These compounds are preferably reacted with oxirane, isocyanate, carboxyl or carboxylic anhyride groups in the polymer.

For the polymer-analogous introduction of radicals having groups which can be induced to form free radicals by radiation, as is to be undertaken here, it is appropriate in principle to use any combination of reactive side groups in the polymer having corresponding groups, suitable as co-reactants, in the low molecular mass reaction component. Groups capable of inter-reacting in this way are required merely to be of such kind that they do not disrupt the preparation of the components, for example the polymerization of the corresponding monomers to give the reactive polymer, and do not react with themselves under the conditions of processing. Appropriate combinations of reactive groups are known and are customary in the modification of polymers by means of polymer-analogous reactions.

Groups which are capable of forming free radicals under actinic irradiation are, preferably, the radicals of aromatic ketones or of quinones, for example of xanthone, thioxanthone, 9,10-anthraquinone, benzil, acetophenone, benzophenone and substituted benzophenones. Particularly preferred parent structures are phenones of the formula

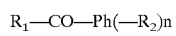

where Ph is a phenylene group with n-1 additional free valences $R_1$ is alkyl or aryl or a radical $R_2$, $R_2$ is OH, $R_3OH$, $N(R_3)_2$, $NHR_4$, $NHR_3OH$, COOH, $COOR_3OH$, $R_3NCO$ or NCO, where $R_3$ is alkyl or alkylene of 1 to 6 carbons and $R_4$ is alkyl of 1 to 6 carbons or cycloalkyl, and n is 1 to 3 and where two or more radicals $R_2$ can be identical to or different from one another.

The alkyl or alkylene groups $R_1$ or $R_2$ generally have 1 to 6, preferably 1 to 3, alkylene groups, in general of at least 2 carbons.

The above-described polymer-analogous reaction produces modified polymers having side groups which under actinic radiation form free radicals. The modified, radiation-sensitive polymers preferably also include groups which have hydrogens that can be eliminated or abstracted under the action of free radicals, especially tertiary hydrogens or hydrogens α to a double bond. They may also contain other crosslinkable side groups, for example free-radically polymerizable double bonds, and especially (meth)acryloyloxy groups.

Such groups are preferably introduced in the course of copolymerization, for example by using isopropyl (meth)acrylate, isobutyl (meth)acrylate, ethylhexyl (meth)acrylate, phenoxyethyl (meth)acrylate, tetrahydrourfiryl (meth)acrylate, furfuryl (meth)acrylate, isobornyl (meth)acrylate or adamantyl (meth)acrylate, alone or in any desired mixture, as comonomers in the preparation of the acrylate or methacrylate copolymers.

Particularly high radiation sensitivity is had by polyacrylates containing incorporated dihydrodicyclopentadienyl groups. Such groups are incorporated into the polyacrylates by, for example, at the same time using dihydrodicyclopentadienyl acrylate, methacrylate, ethacrylate, cinnamate, monomaleate, bismaleate, monofumarate or bisfumarate, alone or in any desired mixture of these dihydrodicyclopentadienyl functional monomers, as monomers in the preparation of the polyacrylates to be used as starting materials in accordance with the invention.

The selection of monomers for combination is made in accordance with principles familiar to the skilled worker, such that they satisfy requirements of the envisaged application. These requirements may differ greatly; for example, transparent automotive topcoats for metallic finishes are required to have very high resistance to yellowness and weathering, high scratch resistance and good gloss retention coupled with high hardness. In the case of a coil coat, ie. a coating material which is used to coat sheet-metal webs which are then coiled and subsequently processed further with deforma-tion, the important factors are elasticity and adhesion.

The price of the monomers may also be a selection criterion, if there are certain applications where the coatings are not required to be of high quality but are required to be of low price.

It is known that, for example, styrene and methyl methacrylate are "hard" monomers, ie. monomers which form homopolymers having a high $T_g$ and which raise the glass transition temperature and softening point of the copolymers in which they are present and increase the hardness of the resulting coatings, whereas, for example, butyl acrylate, ethylhexyl acrylate and tridecyl acrylate, as "soft" monomers, lower the value of these properties but enhance the elasticity. It is also known that relatively small amounts of (meth)acrylic acid or (meth)acrylamide improve the adhesion.

These basic principles in selecting and blending monomers in order to establish basic properties in coating materials are familiar to the polymer chemist and paints expert.

Further constituents of the acrylate copolymers employed in accordance with the invention in the polymer-analogous reaction can be intended to bring about UV crosslinking or UV polymerization of double bonds as a curing reaction instead of or in addition to the crosslinking by hydrogen abstraction. The double bonds necessary for this purpose can be introduced into the polymers by, for example, reacting copolymerized (meth)acrylic acid with glycidyl methacrylate or copolymerized glycidyl methacrylate with (meth)acrylic acid, or, preferably, reacting copolymerized hydroxyalkyl (meth)acrylates with acrylic anhydride or methacrylic anhydride.

The copolymers can also be mixed not only with the polymer-bonded UV photoinitiators capable of hydrogen abstraction but also with other customary UV photoinitiators and, if desired, with customary UV stabilizers.

It is also possible for constituents to be present in the copolymers whose purpose is to enable thermal crosslinking in addition to the UV crosslinking. Suitable examples are glycidyl methacrylate, which is able to react with external crosslinkers such as polyfunctional carboxylic acids or carboxylic anhydrides, or free carboxyl groups of copolymerized (meth)acrylic acid, which can be crosslinked using epoxy resins. Thermal crosslinking by way of copolymerized methylolization products and methylol ethers of (meth)acrylamide are also suitable for co-crosslinking. The aim is to produce interpenetrating networks which, for example, have improved coatings properties. In addition, resins containing double bonds can also be mixed in with the UV-crosslinkable copolymers in order thereby to provide for co-crosslinking by way of double bonds. Such resins can be obtained from polymers containing glycidyl methacrylate by reaction with acrylic acid. Appropriate polymers are described in U.S. Pat. No. 4,064,161 or in DE-A 2436186.

The preparation of the acrylate copolymers used for the novel reaction can be conducted in a known manner by free-radical polymerization in solution or without solvent, a further possibility being the addition of regulators to control the molecular weight of the polymers.

A preferred embodiment consists in preparing the copolymers with or without free-radical polymerization initiators by a polymerization at elevated temperature and under superatmospheric pressure in bulk or in the presence of solvents. A particularly suitable technique is high-temperature continuous bulk polymerization.

The UV-crosslinkable polymers obtained in accordance with the invention can be applied by electrostatic spraying, other spraying techniques, dipping, rolling, knife coating or some other method, from solution or without solvent, and can be crosslinked by UV radiation. Irradiation can also be conducted with simultaneous heating of the materials, or the materials can be additionally heated prior to or after irradiation.

Radiation crosslinking is preferably carried out under UV light, it being possible to tailor the UV absorption of the substances to the energy spectrum of the UV lamps by appropriately selecting the added photoinitiators or the photoinitiators bonded as copolymers and introduced in accordance with the invention.

The finished, radiation-crosslinkable mixtures may also comprise customary auxiliaries, such as catalysts for co-crosslinking, leveling improvers, anticrater agents, adhesion promoters, dyes, pigments, etc.

The amounts, parts (p) and percentages indicated in the following examples are by weight unless specified otherwise.

EXAMPLE 1

A glass flask with stirrer, reflux condenser, two dropping fimnels and a thermometer is charged, while gently flushing with nitrogen, with 243 p of isopropanol and 243 p of toluene.

One dropping funnel is used to add 90 p of isopropanol 90 p of toluene and 30 p of 2,2'-azobis(2-methylbutyronitrile)

over 2 hours and the other dropping funnel is used to add, simultaneously, 300 p of dihydrodicyclopentadienyl acrylate (commercial product), 300 p of methyl methacrylate, 120 p of glycidyl methacrylate, 280 p of butyl acrylate and 10 p of 2-mercaptoethanol over 1.5 hours at 80° C. Polymerization is continued at about 80° C. for 2 hours, and then 166 p of 4-hydroxybenzophenone and 1 p of 4-dimethylaminopyridine are added, the condenser is adjusted for distillation and the mixture is heated to 130° C. while distilling off the solvent. Reaction is continued for 3 hours at 130° C., then the residual solvent is distilled off under reduced pressure and the polymer is poured out as a melt on to aluminum foil, where it solidifies to a brittle resin. The resin is ground to a powder having an average particle size of about 40 μm and is applied electrostatically to cleaned steel panels. The panels are heated for 10 minutes on a hotplate at 140° C. until the powder has melted, and then the melt is irradiated for 3 minutes with a medium-pressure mercury lamp having its principal emission at 365 nm and an energy density of 15 mW/cm². After cooling, the result is a hard, glossy, solvent-resistant coating.

EXAMPLE 2

A glass flask with stirrer, reflux condenser, two dropping fimnels and a thermometer is charged, while gently flushing with nitrogen, with 243 p of isopropanol and 243 p of toluene.

One dropping funnel is used to add 90 p of isopropanol 90 p of toluene and 30 p of 2,2'-azobis(2-methylbutyronitrile)

over 2 hours and the other dropping funnel is used to add, simultaneously, 300 p of methyl methacrylate, 400 p of glycidyl methacrylate, 300 p of butyl acrylate and 10 p of 2-mercaptoethanol over 1.5 hours at 80° C. Polymerization is continued at about 80° C. for 2 hours, and then 139 p of 4-hydroxybenzophenone and 1 p of 4-dimethylaminopyridine are added, the condenser is adjusted for distillation and the mixture is heated to 130° C. while distilling off the solvent. Reaction is continued for 3 hours at 130° C., then the residual solvent is distilled off under reduced pressure, the condenser is set back to reflux and the heating is removed. The cooling melt is dissolved in 520 p of butyl acetate, and then 150 p of acrylic acid, 1 p of 4-dimethylaminopyridine and 2 p of hydroquinone monomethyl ether are added. The mixture is stirred at 95 to 100° C. for 9 hours, during which the acid number falls to 5.8. The resultant resin solution is applied to a clean steel panel using a doctor blade to form a coat which, measured after curing, is about 30 μm thick. The steel panel is placed on a hotplate at 120° C. for 20 minutes. After that time the solvent has largely been evaporated and the film is almost tack-free but not yet resistant to solvent. The film is then irradiated on the hotplate for 1 minute using the same lamp as in Example 1. After cooling, the result is a hard, glossy, solvent-resistant coating.

EXAMPLE 3

A glass flask with stirrer, reflux condenser, two dropping funnels and a thermometer is charged, while gently flushing with nitrogen, with 243 p of isopropanol and 243 p of toluene.

One dropping funnel is used to add 90 p of isopropanol 90 p of toluene and 30 p of 2,2'-azobis(2-methylbutyronitrile)

over 2 hours and the other dropping funnel is used to add, simultaneously, 100 p of dihydrodicyclopentadienyl acrylate, 200 p of methyl methacrylate, 400 p of glycidyl methacrylate, 300 p of butyl acrylate and 10 p of 2-mercaptoethanol over 1.5 hours at 80° C. Polymerization is continued at about 80° C. for 2 hours, and then 139 p of 4-hydroxybenzophenone and 1 p of 4-dimethylaminopyridine are added, the condenser is adjusted for distillation and the mixture is heated to 130° C. while distilling off the solvent. Reaction is continued for 3 hours at 130° C., then the residual solvent is distilled off under reduced pressure, the condenser is set back to reflux and the heating is removed. The cooling melt is dissolved in 520 p of butyl acetate, and then 150 p of acrylic acid, 1 p of 4-dimethylaminopyridine and 2 p of hydroquinone monomethyl ether are added. The mixture is stirred at 95 to 100° C. for 9 hours, during which the acid number falls to 5.8. The resultant resin solution is applied to a clean steel panel using a doctor blade to form a coat which, measured after curing, is about 30 μm thick. The steel panel is placed on a hotplate at 120° C. for 20 minutes. After that time the solvent has largely been evaporated and the film is almost tack-free but not yet resistant to solvent. The film is then irradiated on the hotplate for 1 minute using the same lamp as in Example 1. After cooling, the result is a hard, glossy, solvent-resistant coating.

We claim:

1. A process for preparing radiation-crosslinkable polymeric acrylates and methacrylates, which comprises reacting an acrylate or methacrylate copolymer containing units with lateral dihydrodicyclopentadiene groups and units having a reactive side group with a compound that contains a group which is capable of reacting with the reactive side group and also a group derived from an aromatic ketone or quinone which is capable of forming free radicals under the action of actinic radiation.

2. A process as claimed in claim 1, wherein the reactive side group is an isocyanate, hydroxyl, carboxyl, carboxylic anhydride, amino or oxirane group.

3. A process as claimed in claim 1, wherein the group capable of forming free radicals is derived from an aromatic ketone or quinone.

4. A process as claimed in claim 3, wherein the aromatic ketone or quinone is xanthone, thioxanthone, anthraquinone, benzil, acetophenone or benzophenone.

* * * * *